United States Patent [19]

Schwartz

[11] 4,306,419
[45] Dec. 22, 1981

[54] BRUSHLESS DC MOTOR DRIVEN CRYOGENIC REFRIGERATION SYSTEM

[75] Inventor: Myron Schwartz, St. James, N.Y.

[73] Assignee: Aeroflex Laboratories Incorporated, Plainview, N.Y.

[21] Appl. No.: 196,950

[22] Filed: Oct. 14, 1980

[51] Int. Cl.³ .............................................. F25B 9/00
[52] U.S. Cl. ....................................... 62/6; 310/68 R
[58] Field of Search ..................... 62/6; 310/46, 68 R, 310/165, 177, DIG. 6

[56] References Cited

U.S. PATENT DOCUMENTS

| | | | |
|---|---|---|---|
| 3,341,724 | 9/1967 | Saslow et al. | 310/68 R |
| 3,423,948 | 1/1969 | Cowans | 62/6 |
| 3,774,405 | 11/1973 | Leo | 62/6 |
| 3,853,437 | 12/1974 | Horn et al. | 62/6 |
| 4,044,567 | 8/1977 | Dix et al. | 62/6 |
| 4,220,879 | 9/1980 | Hoshimi et al. | 310/68 R |

FOREIGN PATENT DOCUMENTS 614501  5/1978  U.S.S.R. ............................ 310/165

Primary Examiner—Ronald C. Capossela
Attorney, Agent, or Firm—Wolder, Gross & Yavner

[57] ABSTRACT

A portable cryogenic helium-filled refrigeration system includes a cold finger evaporator, a compressor connected to the cold finger, a brushless DC motor connected to drive the compressor, and an electronic circuit for switching the stator-armature winding currents of the motor. The motor and compressor and the electronic circuit are all enclosed within a common housing which is charged with helium gas refrigerant under pressure.

4 Claims, 3 Drawing Figures

BRUSHLESS DC MOTOR DRIVEN CRYOGENIC REFRIGERATION SYSTEM

BACKGROUND OF THE INVENTION

The present invention relates to brushless DC motor driven cryogenic refrigeration systems, and particularly to such systems which are designed to be portable and small in size and weight and thus useful in aircraft and armored vehicles and tanks used by the armed forces. In such vehicles, cryogenics are used for various purposes such as for cooling the semiconductor chips used in laser range finders, chemical agent detectors, and infrared systems.

In applications such as the above, in various vehicles, the electronic circuit which is used with the brushless DC motor for switching the stator-armature winding currents in synchronism with the rotation of the motor rotor must receive special protection from the operating atmosphere, as well as mechanical protection. The normal procedure for providing such protection is to encapsulate the electronic circuit within an enclosure filled with a potting compound, or hermetically sealed in a gaseous atmosphere. Both of these arrangements involve considerable additional expense, and are subject to problems of possible failure, especially if the exterior enclosure for the circuit is mechanically damaged.

Accordingly, it is one object of the present invention to provide an improved brushless DC motor in combination with a cryogenic refrigeration system in which the separate enclosure for the electronic circuit may be eliminated.

Another problem with existing brushless DC motor-driven cryogenic refrigeration systems is that the motor itself is enclosed within a common housing with the cryogenic refrigerant compressor while the electronic circuit for the motor is housed outside of that housing. The refrigerant used is usually helium. With this arrangement, there are usually eight electrical connections which must be carried through the housing wall between the electronic circuit and the DC motor. Unfortunately, the helium, which is under considerable pressure, (the pressure normally varies between 400 and 900 pounds per square inch), is difficult to contain within the housing and is especially likely to leak out around the eight connections that are carried through the housing wall.

Accordingly, it is another object of the present invention to provide a brushless DC driven cryogenic refrigeration system in which the number of electrical connections which must be carried through the wall of the housing containing the refrigerant is substantially reduced.

Still another problem in portable brushless DC motor driven cryogenic refrigeration systems which are used for vehicles is that the electrical connection leads from the electronic circuit when used with the brushless DC motor to the motor itself cause the radiation of electrical signals which can interfere with the operation of other apparatus such as radio receivers.

Accordingly, it is another object of the present invention to shorten the leads between the electronic field switching circuit of the brushless DC motor and the motor itself in a cryogenic refrigeration system.

Further objects and advantages of the invention will be apparent from the following description and the accompanying drawings.

SUMMARY OF THE INVENTION

In carrying out the objects of the invention there is provided in combination, a portable cryogenic refrigeration system comprising a helium-filled refrigerant system including a cold finger arranged to be immersed in a container to be refrigerated, a compressor connected through a refrigerant line to said cold finger for compressing the helium, a brushless DC motor connected to drive said compressor, said motor and said compressor being housed in a common housing, an electronic circuit for switching the stator-armature winding currents of said motor in synchronism with the rotation of the motor rotor, said electronic circuit being enclosed within said common housing, and the entire interior of said common housing being charged with helium.

DESCRIPTION OF PREFERRED EMBODIMENT

Figure 1:
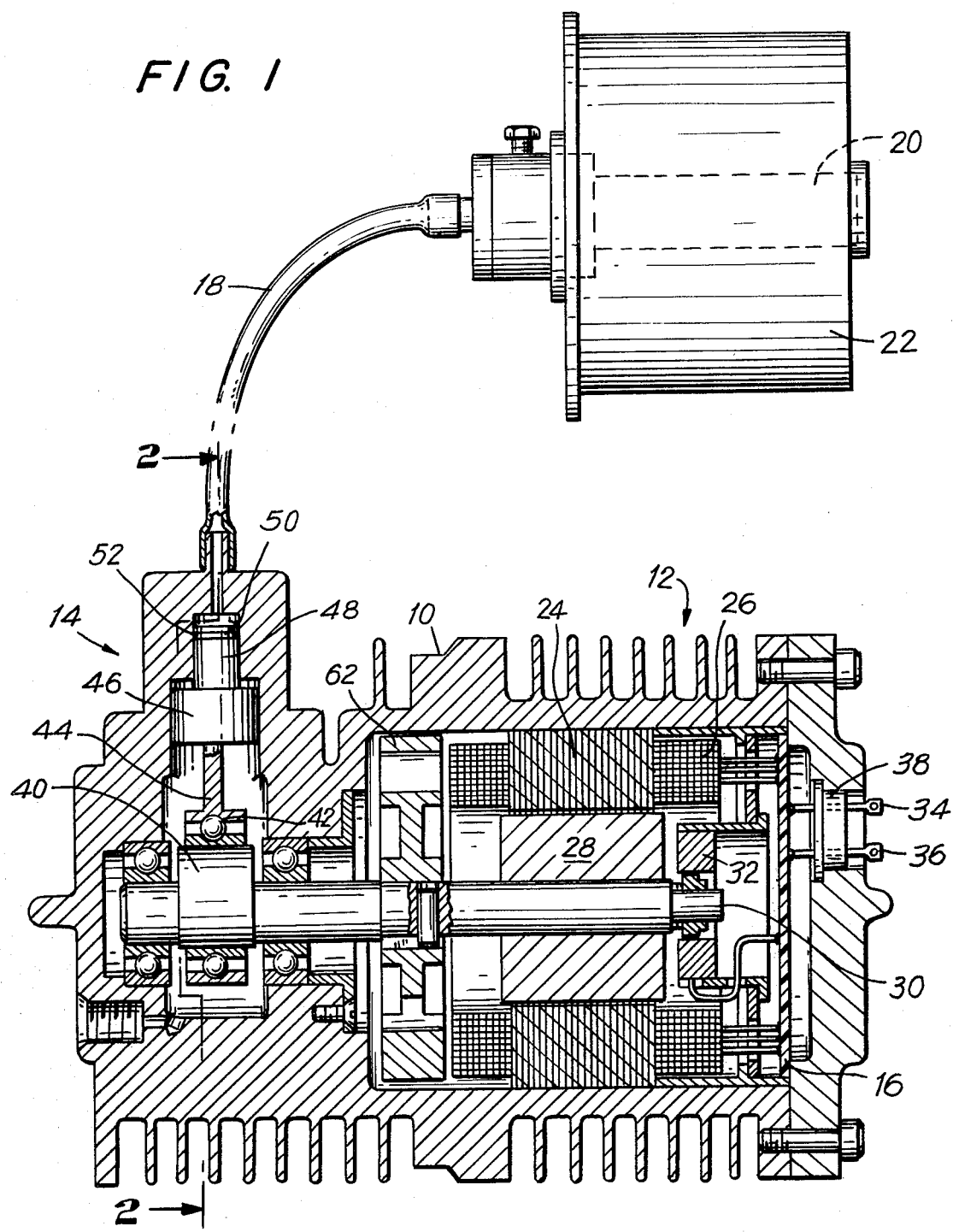
FIG. 1 illustrates a preferred embodiment of a brushless DC motor driven cryogenic refrigeration system in accordance with the present invention, with the motor and the compressor shown partly in section.

Referring in more detail to FIG. 1, there is illustrated a common housing 10 containing a brushless DC motor 12 and a compressor 14. The motor 12 is connected to drive the compressor 14 through a common shaft. Within the housing 10, together with the motor 12, is a printed electronic circuit board 16.

Connected from the compressor 14 there is a refrigerant line 18 which is connected at the other end to the refrigerant evaporator 20, sometimes referred to as a "cold finger", which is immersed in a container 22 which is to be refrigerated. The entire housing 10, including the motor 12 and the compressor 14 and the refrigerant line 18 and the cold finger 20 contain helium gas as a refrigerant.

The brushless DC motor 12 includes a stator-armature 24 having windings indicated at 26, and a permanent magnet rotor 28. The stator-armature windings 26 are connected to the electronic circuit board 16 so that the electronic circuit can switch the stator-armature winding currents in synchronism with the rotation of the motor. In order to provide control signals for the synchronization of the switching of currents with the rotation of the rotor, the rotor is provided with a target device 30 which is sensed by a stationary sensing device 32 each time the target device 30 passes the sensing device 32.

By placing the circuit board inside the housing 10, it is possible to eliminate all but two electrical connections 34 and 36 which must pass through an electrically insulated fitting 38 in the housing wall.

The entire interior of the housing 10 is charged with the helium refrigerant gas. This, therefore, includes the atmosphere surrounding the circuit board 16.

It has been discovered that the helium atmosphere is ideally suited to maintaining the integrity of the circuit board, keeping moisture away from the board and eliminating any need for separate encapsulation. Even though the pressure of the helium within the housing 10 is high, and pulsates in response to the operation of the pump 14, the pressure and the pulsation of pressure does not impair the operation of the circuit. The pressure varies from about 400 to about 900 pounds per square inch at a frequency corresponding to the rotational speed of the motor and the compressor.

The compressor 14 consists of an eccentric 40 carried by the motor shift which operates through a ball bearing 42 and a connecting rod 44 to drive a guide piston 46 and an integral working piston 48 within associated cylinders formed as a part of the housing 10. The working cylinder 50 is connected to the conduit 18 and thus to the cold finger 20.

Figure 2:
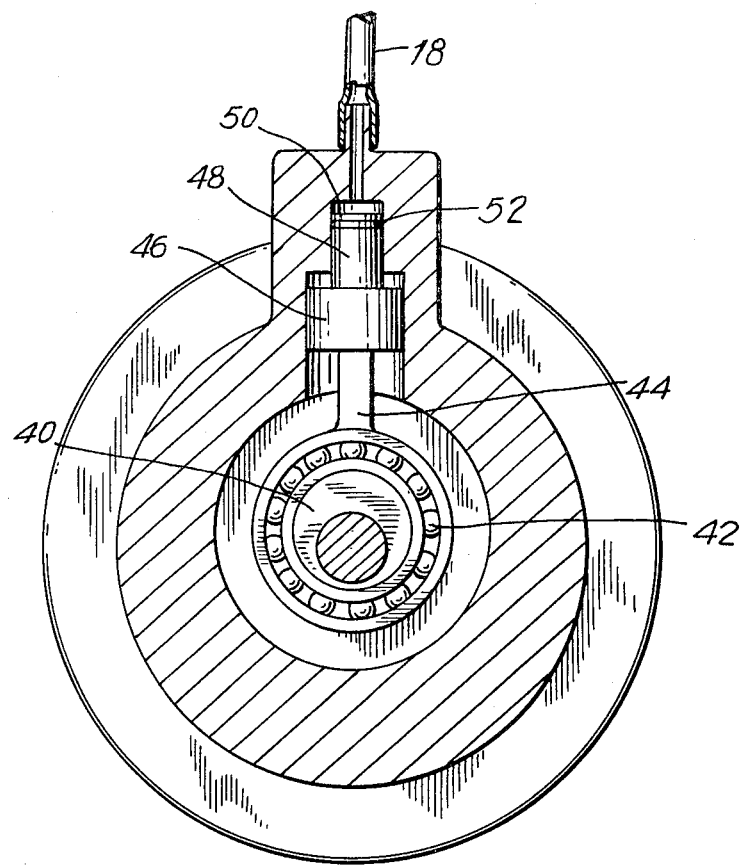
FIG. 2 is a sectional end view of the compressor of FIG. 1 taken at section 2—2.

FIG. 2 illustrates a partial sectional end view of the compressor 14 taken at section 2—2 in FIG. 1. FIG. 2 more clearly shows the parts just described, including the eccentric 40, the bearing 42, the connecting rod 44, the guide piston 46, the working piston 48 and the working cylinder 50. As shown especially in FIG. 2, the working piston 48 preferably has a piston ring 52 to limit leakage.

Figure 3:
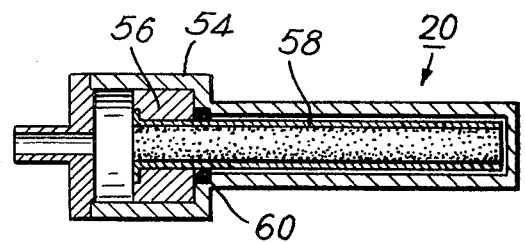
FIG. 3 is a sectional detail view of a part of the cold end of the refrigeration system sometimes referred to as a "cold finger".

FIG. 3 is a sectional detail view of the structure of the cold finger 20. It consists of a housing 54 containing a piston 56 which carries a smaller diameter cylindrical sheath structure 58. Within the sheath 58 there is a porous nickel alloy structure composed of powdered metal which has been formed under high pressure and then sintered in a powdered metallurgy process. This sintered interior of the sheath 58 forms a container into which the helium is compressed by the action of the compressor 14. The compression is carried out by direct compression from the compressor and by movement to the right of the piston 56 and the sheath 58 within the housing 54 in response to the compressed helium at the left side of piston 56. The ends of the sheath 58 are exposed so that the helium may enter the porous interior. After the gas has been compressed within this porous mass, it expands after the compressor pressure is released, and that expansion provides the refrigeration action and also forces piston 56 to the left in the drawing.

In order to provide an appropriate confinement of the inner end of the housing 54 surrounding the sheath 58, a seal ring is preferably provided, as indicated at 60.

A flywheel 62 is preferably provided on the motor shaft in order to smooth out the pulsating load of the compressor. The flywheel is preferably weighted asymmetrically to counterbalance the offset weight of the eccentric 40.

While this invention has been shown and described in connection with a particular preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. In combination, a portable cryogenic refrigeration system comprising a helium-filled refrigerant system including a cold finger arranged to be immersed in a container to be refrigerated, a compressor connected through a refrigerant line to said cold finger for compressing the helium, a brushless DC motor connected to drive said compressor, said motor and said compressor being housed in a common housing, an electronic circuit for switching the stator-armature winding currents of said motor in synchronism with the rotation of the motor rotor, said electronic circuit being enclosed within said common housing, and the entire interior of said common housing being charged with helium.

2. A system as claimed in claim 1 wherein said electronic circuit is a printed circuit.

3. A system as claimed in claim 2 wherein said printed circuit is a hybrid printed circuit.

4. A system as claimed in claim 2 wherein said circuit is open to the interior of said housing.

* * * * *